United States Patent
Reents et al.

(10) Patent No.: US 6,978,412 B1
(45) Date of Patent: Dec. 20, 2005

(54) METHOD AND APPARATUS FOR ADAPTIVE FRAME TRACKING

(75) Inventors: Daniel B. Reents, Dripping Springs, TX (US); Patrick Maupin, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 09/375,120

(22) Filed: Aug. 16, 1999

(51) Int. Cl.[7] .................. G08C 25/00; H03M 13/00
(52) U.S. Cl. .................... 714/746; 714/774
(58) Field of Search .............. 714/746, 799, 714/758, 798; 710/300; 370/395.72

(56) References Cited

U.S. PATENT DOCUMENTS

| | | | |
|---|---|---|---|
| 4,939,731 A | 7/1990 | Reed et al. | 714/746 |
| 5,612,933 A | 3/1997 | Iso et al. | 369/32 |
| 5,778,218 A | 7/1998 | Gulick | 713/503 |
| 5,958,027 A * | 9/1999 | Gulick | 710/300 |
| 6,021,129 A * | 2/2000 | Martin et al. | 370/395.72 |

OTHER PUBLICATIONS

Seneviratne and Sarikaya, "Cellular networks and mobile internet," *Computer Communications,* 21:1244-1255, 1998.

* cited by examiner

*Primary Examiner*—Shelly Chase
(74) *Attorney, Agent, or Firm*—Williams, Morgan & Amerson, P.C.

(57) ABSTRACT

The present invention provides for an apparatus and a method for performing adaptive frame tracking. The present invention comprises an adaptive frame tracking unit capable of receiving and sending at least one data packet and automatically adjusting a data rate of the data packet by determining if there exists at least one data frame error and correcting for the data frame error in response to a determination that there exists at least one the data frame error.

41 Claims, 7 Drawing Sheets

METHOD AND APPARATUS FOR ADAPTIVE FRAME TRACKING

BACKGROUND OF THE INVENTION

1. Field of the Invention

This invention relates generally to data synchronization relating to telecommunications, and more particularly, to tracking frames of data during data transfers.

2. Description of the Related Art

Advancements in computer technology have facilitated developments of new methods of computer system communications. One area of advancement in computer technology is the improvement made in data bus communications. Recently, a new system of bus communications, the Universal Serial Bus (USB), has improved data communications within computer systems. Generally, to implement USB communications within a computer system, a computer system must have an operating system that is designed to decipher USB-type data. More recently, many computer systems that are produced contain software and hardware that facilitate USB communications.

USB communications can also facilitate "plug and play" implementation. In other words, using USB communications allows for computer peripherals to be implemented into computer systems with ease. Computer peripherals such as scanners, digital joysticks, digital speakers, or PC telephones can be attached to a computer system without the tedious task of determining proper input ports and interrupts. Implementing USB into a computer system can result in the capability of adding computer peripherals without the complications of determining the complex protocols that are generally required for implementation of peripherals. In other words, adding a new digital scanner onto a computer system now does not require adding a PC interface card, installing a software package, or changing computer interrupts; instead, the USB now allows for simple plug and play installation of the digital scanner.

Furthermore, USB allows for the capability of uninterrupted installation of computer peripherals into a computer system. This feature is generally known as "hot-installation." In fact, the USB permits the installation of electronic devices, such as generic computer peripherals, into computer systems without having to interrupt or shut down a task that is being conducted by a computer system. By implementing a "daisy-chain" system of installing computer peripherals, USB allows for installation of multiple computer peripherals into a relatively small amount of USB input ports.

Another advantage of implementing USB systems in computer systems is the simplification of distribution of power for electronic devices that are interfaced with the computer system. USB ports are generally capable of supplying necessary electrical power to attached computer peripherals. This advantage reduces the need for independent power supplies for each electronic device that is interfaced with a computer system, thereby saving electrical power and valuable electronic real estate.

Generally, USB systems allow bi-directional data communications through its ports. In other words, a computer system can perform two-way communications with an electronic device that is interfaced with the computer system. The bi-directional communication feature that the USB provides can result in new and innovative methods of controlling computer peripherals. For example, by employing the USB system, a computer system can be utilized to automatically manage a telephone communications center to maintain voice data, facsimile data, and electronic data mailboxes. Also, utilizing the bi-directional communications system facilitated by USB systems facilitates computer system control of USB-compliant stereo speakers to match the acoustics of a particular listening environment.

USB system communications include sending and receiving packets of data to and from computer peripherals and computer systems. Many times, errors can occur when packets of data are transmitted and received. Often, packets of data, particularly isochronous frames of data, can lose their synchronous flow, resulting in transmission errors. The state of the art lacks an efficient method and means of recovering from data transmission errors. Furthermore, the state of the art does not currently provide an efficient means of automatically compensating for data rate errors.

The present invention is directed to overcoming, or at least reducing the effects of, one or more of the problems set forth above.

SUMMARY OF THE INVENTION

In one aspect of the present invention, an apparatus is provided for performing adaptive frame tracking. The present invention comprises an adaptive frame tracking unit capable of receiving and sending at least one data packet and automatically adjusting a data rate of the data packet by determining if there exists at least one data frame error and correcting for the data frame error in response to a determination that there exists at least one the data frame error.

In another aspect of the present invention, a method is provided for performing adaptive frame tracking. At least one data packet from a data stream is monitored. Transmit data buffering of the data packet is supported. Whether at least one data packet is missing from a received data stream, is determined. A start of frame rate control for the data packet for the missing data packet, is established. An auto rate control of the data packet is supported.

BRIEF DESCRIPTION OF THE DRAWINGS

The invention may be understood by reference to the following description taken in conjunction with the accompanying drawings, in which like reference numerals identify like elements, and in which.

Figure 1:
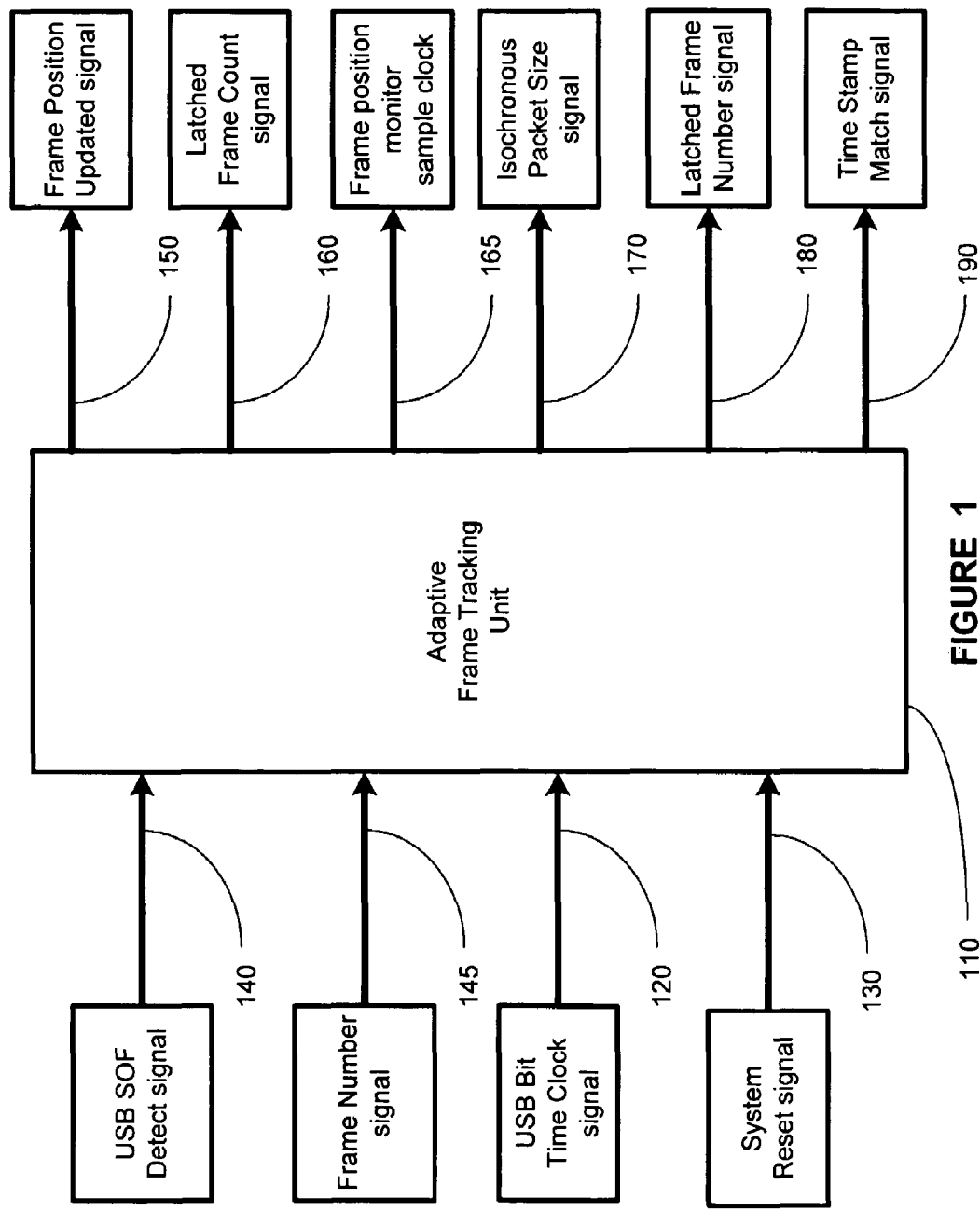
FIG. 1 illustrates one embodiment of the apparatus, an adaptive frame tracking unit, of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The use of Universal Serial Bus (USB) systems in the field of computer technology has improved computer usage and computer communications. Implementing USB-related solutions for computer technology can result in improvements in the quality and efficiency of computer system usage. The present invention provides for a method and apparatus for efficiently recovering from data packet framing errors, particularly start of frame errors. The present invention also provides for a computer software solution for determining a frame number of the data packet being transmitted on a USB system. Furthermore, the present invention provides for an automated method of adjusting a data rate of isochronous data transfers. The methods described by the present invention may be implemented through software, hardware, or firmware technologies. The methods described by the present invention may also be implemented by any combination of software, hardware, and firmware technologies.

Generally, packets of data are transmitted to and from a computer system and computer peripherals. The packets of data being transmitted generally contain start of frame sections, which contains information regarding the data packets being transmitted. In one embodiment, a USB system device, such as a USB host (not shown), transmits a set of generic data patterns along with specific, unique data. In one embodiment, the USB host is a computer system. The set of generic data patterns include uniform data patterns that aid computer systems in identifying a data packet, synchronizing the reception of data, and identifying the end of a particular data pattern. In one embodiment, a packet of data that is transmitted via a USB communication system includes a packet identification data pattern within the packet of data. In one embodiment, the packet identification data pattern is a start of frame (SOF) data pattern. Generally, a start of frame is sent by a USB host at a rate of once per frame of USB data.

Turning now to FIG. 1, one embodiment of the apparatus, an adaptive frame tracking unit 110, of the present invention is illustrated. In one embodiment, digital logic circuits that are encompassed in the adaptive frame tracking unit 110 to operate in sync with the USB bit time clock on a line 120. A system reset signal on a line 130 is capable of resetting the logic functions of the digital logic circuits that are encompassed in the adaptive frame tracking unit 110. The adaptive frame tracking unit 110 receives a USB start of frame signal on a line 140 and performs digital functions to produce several digital signals for performing adaptive frame tracking. The adaptive frame tracking unit 110 also receives a frame number signal on a line 145. The digital signals generated by the adaptive frame tracking unit 110 includes the frame position updated signal on a line 150, a latched frame count signal on line 160, a frame position monitor sample clock on a line 165, an isochronous packet size signal on a line 170, a latched frame number signal on a line 180, and a time stamp match signal 190. In one embodiment, the steps comprising adaptive frame tracking is illustrated in FIG. 2.

In one embodiment, the method and apparatus of the present invention monitors a USB start of frame data pattern. The adaptive frame tracking unit 110 is employed to support multiple data synchronization functions required by the USB system while it is transmitting or receiving data via the USB. In one embodiment, the start of frame packet sent by a host USB includes a sync data field, a packet identification data field, a frame number field, a CRC5 bit, and an end of packet (EOP) data field. In one embodiment, the frame number data field comprises of a twelve-bit data field. In one embodiment, the function of monitoring the start of frame data packet is important in supporting isochronous data transfers.

Isochronous data generally refers to time-dependant data. In other words, isochronous data transfer refers to processes where data is transmitted and received within certain time constraints. In one example, for multimedia data communications, an isochronous transport mechanism is generally required since data must be delivered as fast as it is displayed such that audio and video signals are synchronized. In contrast, asynchronous data transmission generally refers to processes in which random intervals can exist between transmission of packets of data. In further contrast with isochronous data transmission, synchronous data transmission can generally only be received or sent during specific intervals. Isochronous data transmission generally does not require a rigid protocol such as the one that is generally required for transmission of synchronous data. However, isochronous data transmission generally requires a more rigid protocol than the one required by the transmission of asynchronous data.

Figure 2:
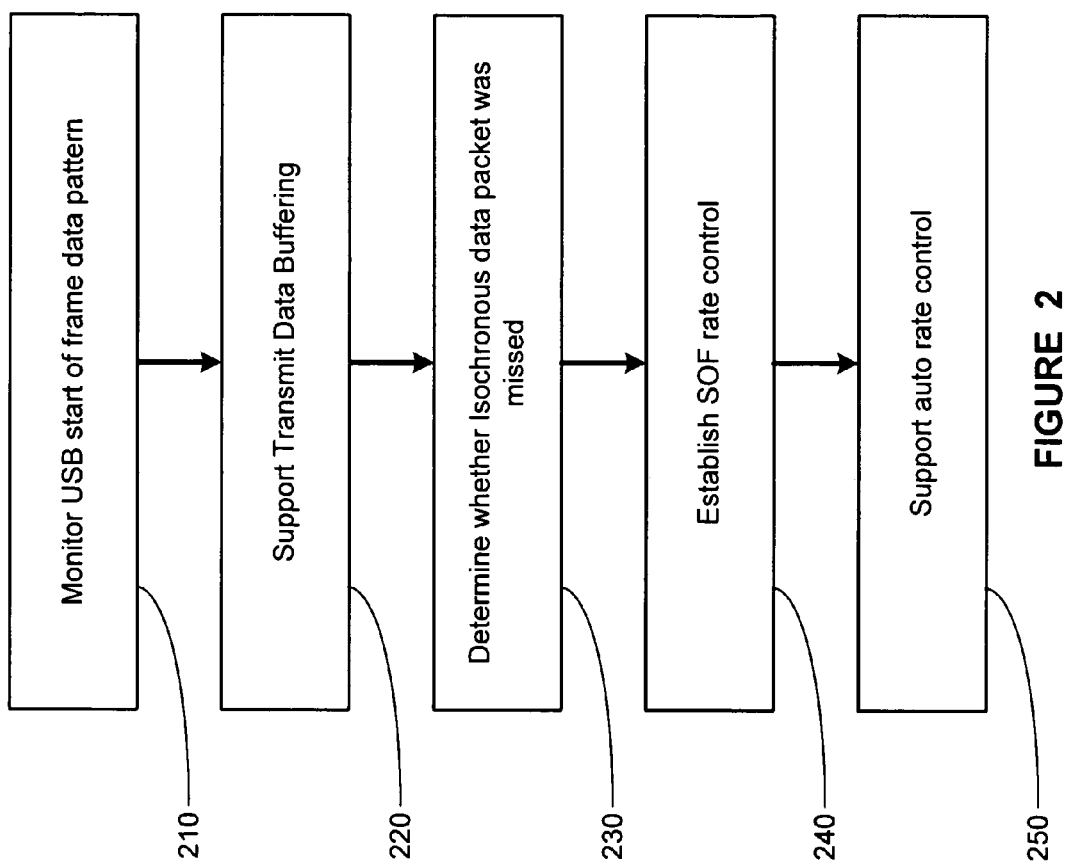
FIG. 2 illustrates a flowchart depiction of the primary tasks performed by the method and apparatus of the present invention.

Turning now to FIG. 2, a block diagram depiction of the primary tasks performed by the method and apparatus of the present invention, is illustrated. One of the primary functions of the adaptive frame tracking unit 110 is to monitor the USB start of frame data pattern, as described in block 210 of FIG. 2. The adaptive frame tracking unit 110 supports a transmit data buffering function, as described in block 220 of FIG. 2. Buffering the transmitted data allows the adaptive frame tracking unit 110 to control the USB data flow rate. The adaptive frame tracking unit 110 also determines whether at least one isochronous data packet was missed, as described in block 230 of FIG. 2. The adaptive frame tracking unit 110 also establishes a data rate for the start of frame, as described in block 240 of FIG. 2. The adaptive frame tracking unit 110 is capable of providing an automated data rate control for data transmission on a USB system, as described in block 250 of FIG. 2.

Figure 3:
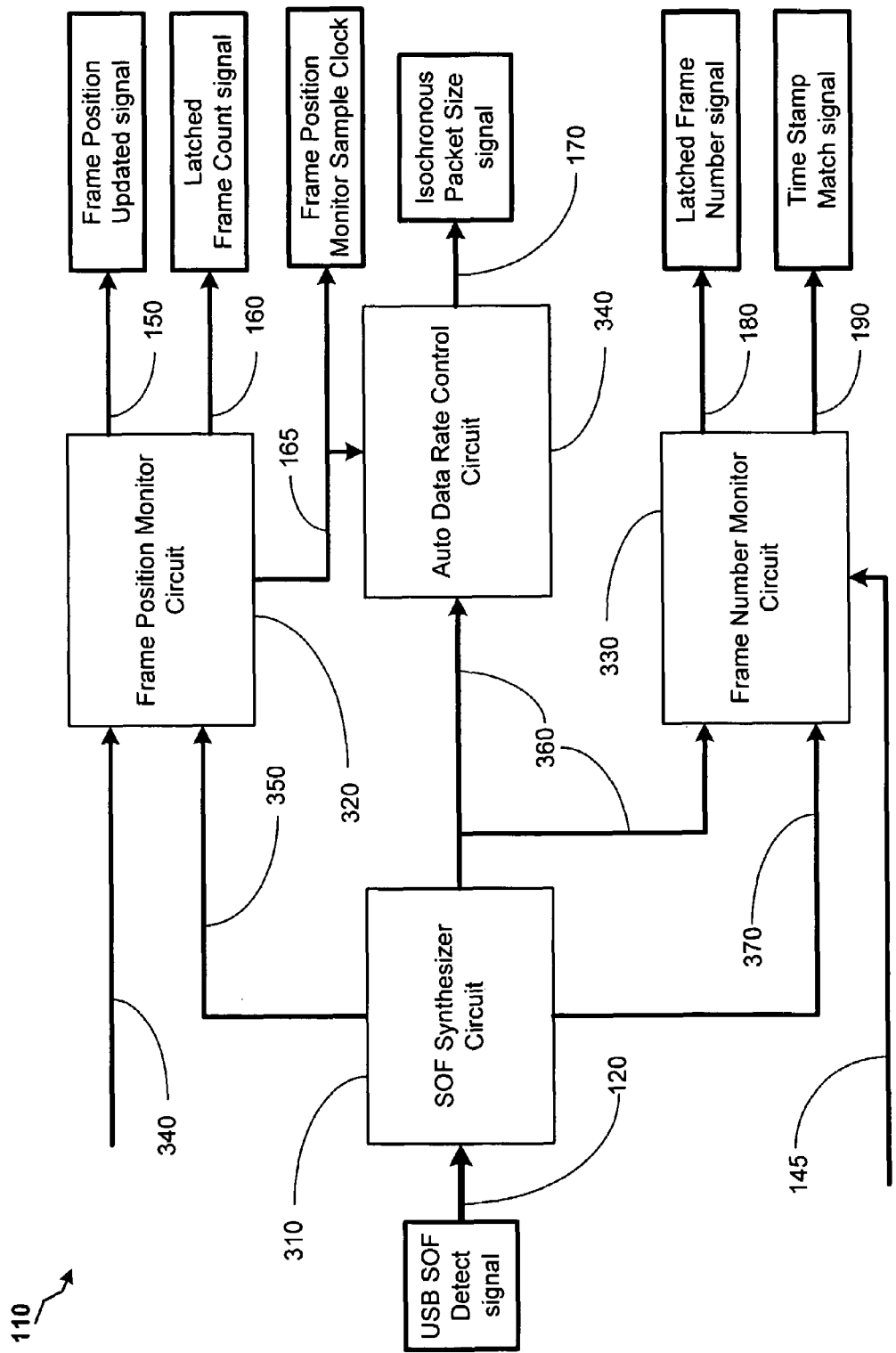
FIG. 3 illustrates a more detailed block diagram depiction of the multiple sections of the frame tracking unit described in FIG. 1.

The adaptive frame tracking unit 110 is capable of monitoring an USB system for a start of frame data packet and generating a start of frame data packet if one is not received. The start of frame data packet may be missing during data transmission for various reasons including the reasons that the USB host may not send a start of frame data packet or data on the USB has been corrupted. The creation of a start of frame data packet is generally known as start of frame synthesis. Turning now to FIG. 3, more detailed block diagram depiction of the adaptive frame tracking unit 110, is illustrated. In one embodiment, the adaptive frame tracking unit 110 includes a start of frame synthesizer circuit 310, a frame position monitor circuit 320, a frame number monitor circuit 330, and an auto data rate control circuit 340.

The start of frame synthesizer circuit 310 generates a frame count signal on a line 350, which is sent to the frame position monitor circuit 320. The frame position monitor circuit 320 generates a frame position updated signal on the line 150, which is used to latch the frame count signal and create the latched frame count signal on the line 160. The frame position monitor 320 also generates a frame position monitor sample clock on a line 165. The start of frame synthesizer circuit 310 also generates a synthesized start of frame signal on a line 360, which are sent to the frame number monitor circuit 330 and the auto data rate control circuit 340. The auto data rate control circuit 340 generates an isochronous packet size signal on the line 170. The start of frame synthesizer circuit 310 also generates a missed start of frame signal on a line 370, which is sent to the frame number monitor circuit 330. The frame number monitor circuit 330 generates the latched frame number signal on the line 180, and the time stamp match signal on the line 190. The signals generated by the adaptive frame tracking unit 110 can be used in combination with a USB host to perform start of frame synthesis, start of frame monitoring, automatic data rate control, and other adaptive frame tracking tasks.

Figure 4:
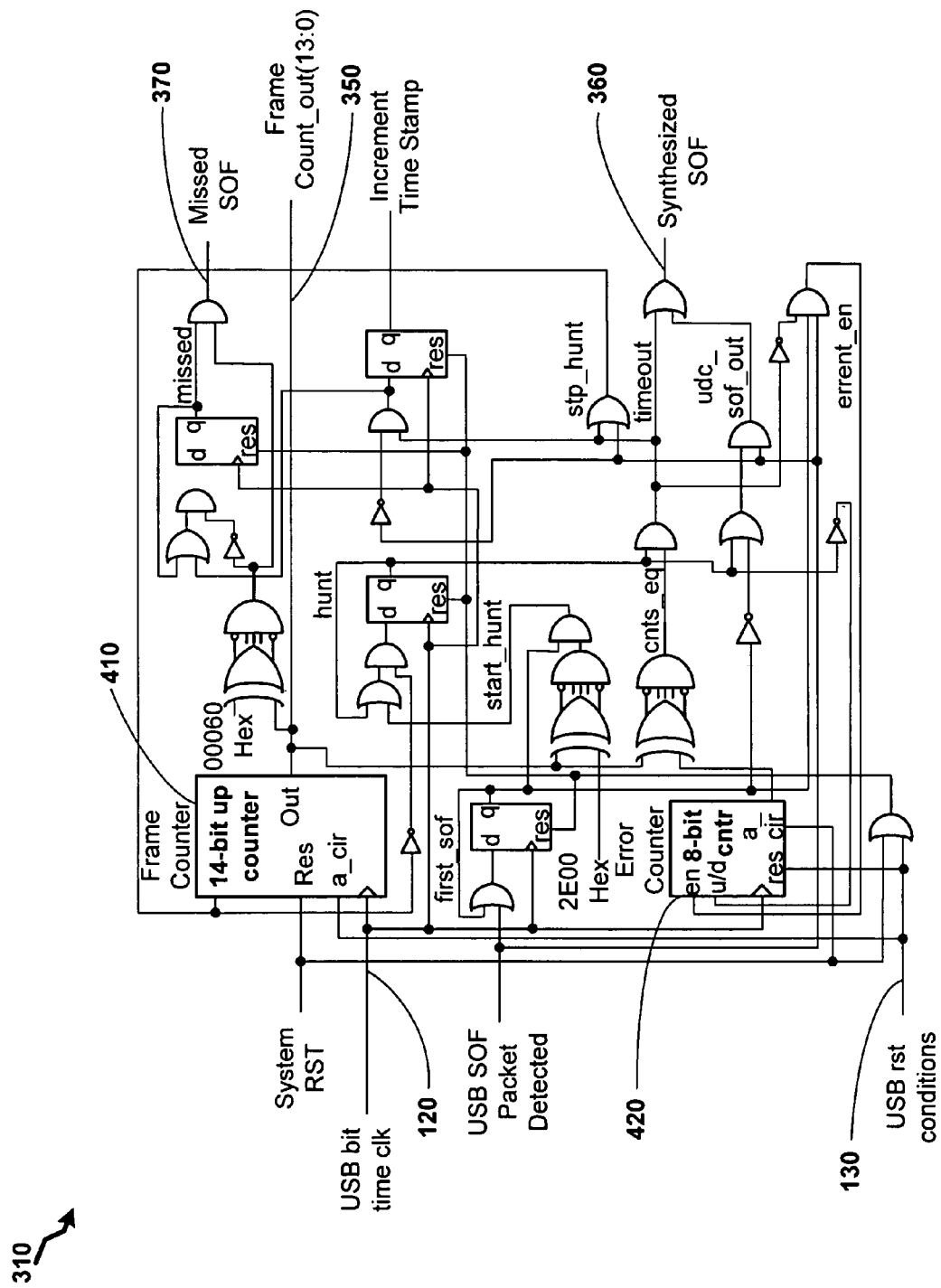
FIG. 4 illustrates one embodiment of the start of frame synthesizer circuit described in FIG. 3.

Turning now to FIG. 4, one embodiment of a more detailed depiction of the start of frame synthesizer circuit 310, is illustrated. The start of frame synthesizer circuit 310 employs an adaptive frame tracking method to monitor data streams on the USB system to check for start of frame data patterns. The start of frame synthesizer circuit 310 is capable of detecting a missing start of frame data pattern. In one embodiment, the start of frame synthesizer circuit 310 then synthesizes a new start of frame data pattern and adds it to the data stream. The start of frame synthesis, in one embodiment, causes the start of frame interval length to be approximately the same as the start of frame interval length of the previous successfully received start of frame data pattern.

The start of frame synthesizer circuit 310 employs two counters, the frame counter 410 and the error counter 420, to track the number of bits in a particular frame of data. In one embodiment, the frame counter is incremented by the USB bit time clock on the line 120. The frame counter 410 is reset each time a start of frame is detected or each time a start of frame is synthesized. The output of the frame counter 410 is used to generate the frame count signal on a 350, which is sent to the frame position monitor circuit 320.

The error counter 420 is incremented or decremented based upon the number of bits in the data frame. The incrementing and the decrementing of the error counter 420 allow the synthesized start of frame length to be adaptable to the actual start of frame length. The outputs of the frame counter 410 and the error counter 420 are used to generate the synthesized start of frame signal on a line 360, which is sent to the auto data rate control circuit 340 and the frame number monitor circuit 330. In one embodiment, the synthesized start of frame signal on the line 360 is generated at approximately the same equivalent period of time as the previous start of frame data packet.

The synthesized start of frame signal on the line 360 is generated earlier than the equivalent period of time as the previous start of frame data packet when the start of frame data packet is received before the expected time. Furthermore, the frame count signal on the line 350 is decremented when the start of frame data packet is received before the expected time period. The synthesized start of frame signal on the line 360 is generated at approximately the period of time as the previous start of frame data packet when the start of frame data packet is received later than the expected time period. The frame count signal on the line 350 is incremented when the start of frame data packet is received later than the expected time. The frame count signal on the line 350 is not incremented or decremented when the start of frame data packet is received at the expected time period. In one embodiment, an additional missed start of frame signal on the line 370 is generated when the start of frame data packet is not received within a predetermined period of time period after the start of frame data packet was expected.

Generally, synchronized isochronous data endpoints synchronize their data to approximately match the data rate of the USB host. In one embodiment, an isochronous data endpoint (endpoint) is a computer peripheral device. The adaptive frame tracking unit 110 is capable of monitoring USB start of frame data packet rate and modify the start of frame data packet rate to synchronize to the data rate of the USB host. In one embodiment, an external output that reflects the internally synthesized start of frame signal, is provided. The signal allows an external computer peripheral device, such as a digital signal processor (DSP), to monitor the data rate of the USB start of frame data packet. When the data rate of the USB host start of frame data changes, the data rate of the isochronous endpoint is changed to track or adapt to the data rate of the USB host start of frame data. The adaptation of the data rate of the isochronous to the data rate of the USB host start of frame data is generally called adaptive synchronization.

In another embodiment, the adaptive frame tracking unit 110 is capable of synchronizing its data rate to a USB bit time clock on the line 120. This synchronization is performed by the adaptive frame tracking unit 110 by monitoring the data rate of USB data frames and requesting the USB host to change its data rate accordingly. In other words, the adaptive frame tracking unit 110 requests the USB host to change the number of USB data clocks in a single USB frame of data, thereby changing the USB data frame interval. The adaptation of the USB data frame interval is generally known as start of frame mastership. The frame position monitor circuit 320 is provided to allow the adaptive frame tracking unit 110 to perform the start of frame mastership.

Figure 5:
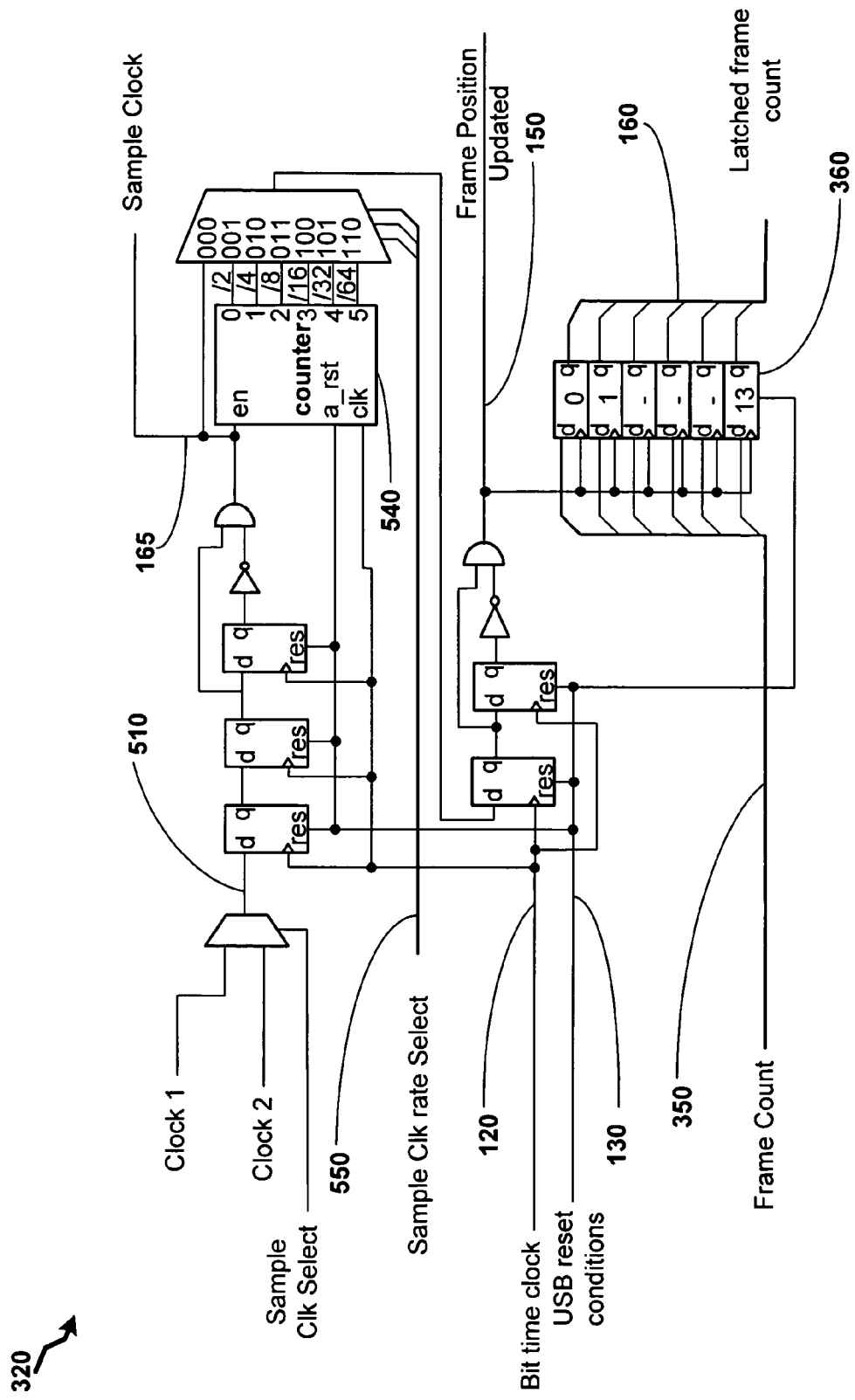
FIG. 5 illustrates one embodiment of the Universal Serial Bus frame position monitor circuit described in FIG. 3.

Turning now to FIG. 5, a more detailed embodiment of the frame position monitor circuit 320 is illustrated. In one embodiment, the frame position monitor circuit 320 monitors two different input clocks, and selects one clock to be a sample clock signal on a line 510. The frame monitor position circuit 320 detects the positive edge of the sample clock signal on a line 510, synchronizes the sample clock signal, and generates a single clock-wide frame position monitor sample clock on the line 165. Utilizing a dividing counter 540, the frame position monitor circuit 320 is capable of dividing the frame position monitor sample clock on the line 165 by 1, 2, 4, 8, 16, 32, or 64 times. The dividing factor used to divide the frame monitor sample clock on the line 165 is selected by the sample clock rate select signal on a line 550. The frame position monitor circuit generates a frame position updated signal on a line 150 and utilizes this signal to latch the frame count signal on the line 350 to generate the latched frame count signal on the line 160. The frame count signal on the line 350 is latched into the frame count register 360. The latched frame count signal on the line 160 is latched on the positive edge of the divided frame position sample clock.

The latched frame count signal on the line 160 represents the data rate from a source, such as a computer peripheral plugged into a USB port of a computer system. The latched frame count signal can be read by the central process unit (CPU) (not shown) of a USB host. Software in a computer peripheral device can determine how its data rate is changing relative to a USB data clock by examining the latched frame count signal on the line 160 at various programmable time periods of the sample clock on the line 510 and request to the USB host to modify the USB data rate.

Figure 6:
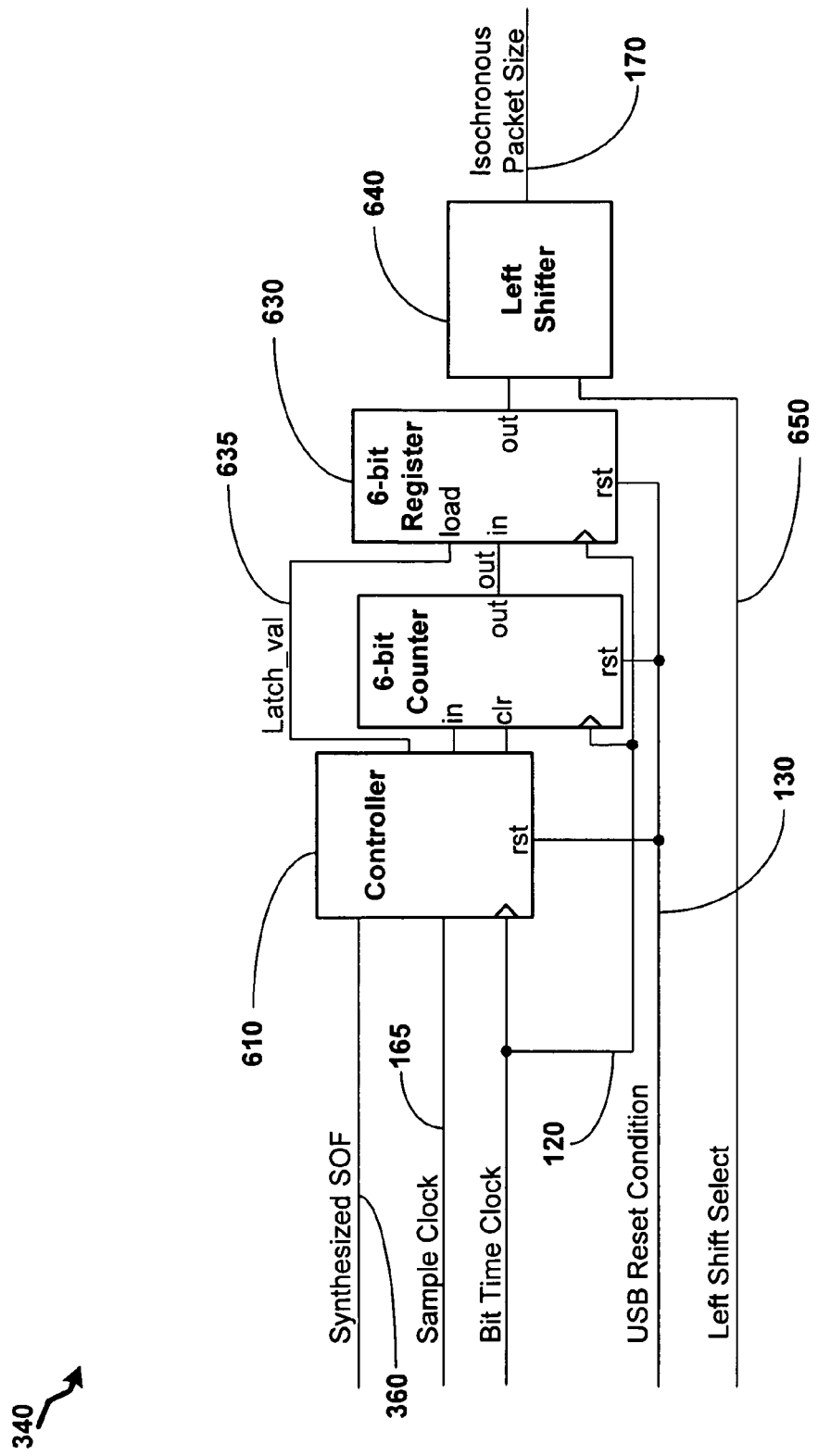
FIG. 6 illustrates one embodiment of the auto data rate control circuit described in FIG. 3.

Turning now to FIG. 6, a more detailed embodiment of the auto data rate control circuit 340, is illustrated. Utilizing the auto data rate control circuit 340, the adaptive frame tracking unit 110 is capable of automatically controlling the data rate of an isochronous data endpoint by using the data sample rate of the source, such as a computer peripheral, and the USB data frame rate. This is one form of adaptive data synchronization called auto rate control. The auto rate controller circuit 340 uses the frame position monitor sample clock on the line 165 to increment an auto rate counter 610. The auto rate counter 610 is incremented and cleared by the auto rate controller 620. The auto rate counter 610 is clocked by the USB bit time clock signal on the line 120. When the auto rate control circuit 340 receives the synthesized start of frame signal on the line 360, the count value in the auto rate counter 610 is latched into an auto rate register 630. The count value from the auto rate counter 610 is latched into the auto rate register 630 by a count value latch signal on a line 635, which is generated by the auto rate controller 620. The auto rate counter 610 is then cleared and re-enabled by the auto rate controller 620. The latched count value from the auto rate counter 610 is then multiplied by 1, 2, or 4 by a left-shifter multiplier 640 and presented to the data endpoints as the isochronous packet size signal on the line 170. The multiplication factor used by the left-shifter multiplier 640 is controlled by the left shifter select signal on a line 650.

The isochronous packet size signal on the line 170 is used to automatically select the number of bytes that the isochronous endpoint will return to the USB host during the next IN transaction from the endpoint. The left shifter multiplier 640 is provided to support data sources that have more than one byte of data per sample. In one embodiment, the mechanism described in FIG. 3 is implemented under an assumption that when the synthesized start of frame signal on a line 360 is generated, data that is to be sent to the USB host from a particular IN endpoint resides in a memory section (not shown) of a USB system. A plurality of data management systems that are known to those skilled in the art, may be employed to manage data movement processes between the memory section and a data endpoint.

Figure 7:
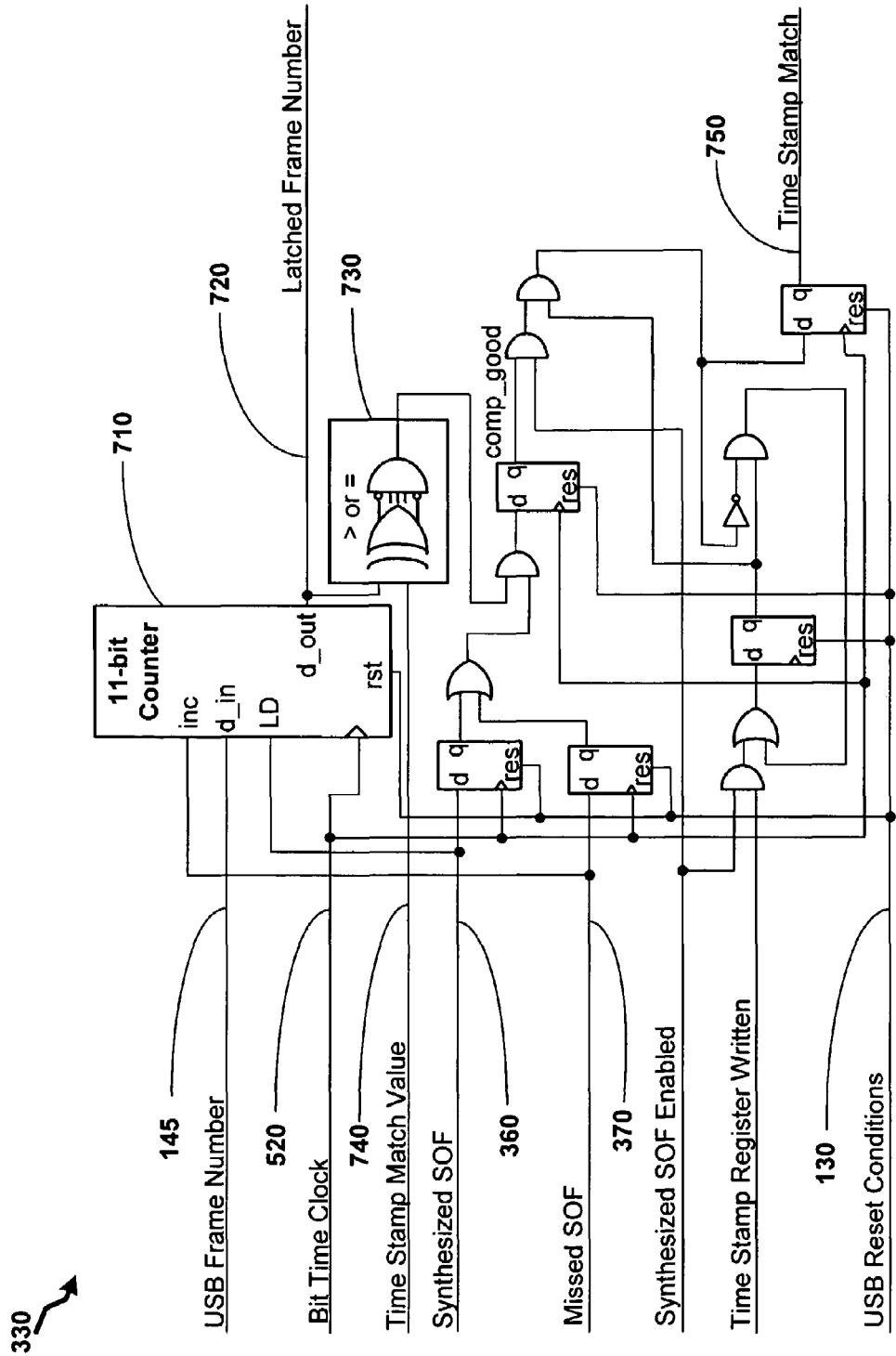
FIG. 7 illustrates one embodiment of the frame number monitor circuit described in FIG. 3.

Turning now to FIG. 7, a more detailed depiction of the frame number monitor circuit 330, is illustrated. A start of frame data packet generally contains a USB frame number value, which is placed on the USB frame number signal on the line 145. The USB frame number signal on the line 145 is passed to a peripheral device, from the USB host, in each start of frame data packet that is successfully received by the peripheral device. The USB frame number value contained in the start of frame data packet is latched each time the synthesized start of frame signal on the line 360 is asserted. The frame number monitor circuit 330 latches the USB frame number signal using a frame number monitor counter 710 and generates the latched USB frame number signal on a line 720. The USB frame number signal may be then read to determine the present frame number value.

In one embodiment, the USB frame number signal may not be latched if a start of frame data packet is not received by the computer peripheral device in a particular frame of data. When a start of frame data packet is missing from a frame of data, the start of frame synthesizer circuit 310 generates the missed start of frame signal on the line 370, which is sent to the frame number monitor circuit 330. When the missed start of frame signal on the line 370 is asserted, the frame number monitor counter 710 increments the previously latched USB Frame number signal on the line 710, by one.

The frame number monitor circuit 330 includes a time stamp match register 730 that can be loaded, through a time stamp match signal on a line 740, by the USB system software. The time stamp match register 730 is utilized to generate a time stamp match signal on a line 750 when the latched frame number signal on the line 720 is equal to or greater than the time stamp match value signal on the line 740. In one embodiment, the time stamp match value is loaded into the time stamp register through the time stamp match signal on the line 750. In one embodiment, the time stamp match signal on the line 750 will be generated until the time stamp match register 730 is written again. In one embodiment, generating the latched frame number signal on the line 720 and the time stamp match signal on the line 750, provides the USB system software information regarding the frame number of the corrupted or missing start of frame data packet. The principle taught by the present invention may be utilized for other type of data communication systems.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An apparatus for performing adaptive frame tracking, comprising an adaptive frame tracking unit capable of receiving and sending at least one data packet and automatically adjusting a data rate of said data packet by determining if there exists at least one data frame error and correcting for said data frame error in response to a determination that there exists at least one said data frame error.

2. The apparatus of claim 1, wherein said adaptive frame tracking unit receives and sends at least one universal serial bus data packet.

3. The apparatus of claim 1, wherein said adaptive frame tracking unit is capable of receiving a frame of data from a computer peripheral device and perform adaptive frame tracking upon said frame of data and transmitting said frame of data.

4. The apparatus of claim 3, wherein said computer peripheral device is one of a computer modem, a scanner, a multimedia system, a computer mouse, and an external data read/write device.

5. The apparatus of claim 1, wherein said adaptive frame tracking unit is capable of receiving a frame of data from a universal serial bus host and performing adaptive frame tracking upon said frame of data and transmitting said frame of data.

6. The apparatus of claim 3, wherein said universal serial bus host is a computer system.

7. The apparatus of claim 1, wherein said data frame error further comprises a missing start of scan data pattern.

8. The apparatus of claim 1, wherein said adaptive frame tracking unit comprises:
- a start of frame synthesizer circuit for monitoring data streams and determining whether there exists a start of frame data packet and performing a start of frame synthesis in response to a determination that a start of scan does not exist;
- a frame position monitor circuit coupled with said start of frame synthesizer for generating a frame position monitor sample clock and a latched frame count signal;
- an auto data rate control circuit, said auto data rate control circuit being coupled with said start of frame synthesizer circuit and said frame position monitor circuit, for generating a data packet size signal to determine a number of bytes to be received in said data frame; and
- a frame number monitor circuit, said frame number monitor circuit being coupled with each of said start of frame synthesizer circuit, said frame position monitor circuit, and said auto data rate control circuit, for determining a present data frame number value and generating a time stamp match signal for determining whether a frame number corresponding to a data frame that has a missing start of frame data packet.

9. The apparatus of claim 8, wherein said adaptive frame tracking unit is capable of performing adaptive synchronization.

10. The apparatus of claim 8, wherein said start of frame data packet comprises of a sync data field, a packet identification data field, a frame number field, a CRC5 bit, and an end of packet data field.

11. The apparatus of claim 8, wherein said start of frame synthesizer circuit comprises:
- a frame counter for generating at least one data frame signal;
- an error counter electronically coupled with said frame counter for generating a start of frame status signal; and
- a set of digital logic electronically coupled with said frame counter and said error counter for generating at least one said data frame signal and said frame status signal.

12. The apparatus of claim 11, wherein said start of frame synthesizer circuit is capable of tracking a number of bits in a frame of data.

13. The apparatus of claim 11, wherein said start of frame synthesizer circuit is capable of detecting a missing start of frame data pattern.

14. The apparatus of claim 11, wherein said start of frame synthesizer circuit is capable of performing a start of frame synthesis.

15. The apparatus of claim 11, wherein said data frame signal further comprises of a frame count signal.

16. The apparatus of claim 11, wherein said frame status signal further comprises of a synthesized start of frame signal.

17. The apparatus of claim 11, wherein said frame status signal further comprises of a missed start of frame signal.

18. The apparatus of claim 8, wherein said frame position monitor circuit further comprises:
- a dividing counter for dividing at least one clock signal;
- a frame count register logically coupled with said clock signal for latching a frame count signal; and
- a set of digital logic electronically coupled with said dividing counter and said frame count register for generating said clock signal and latching said frame count signal.

19. The apparatus of claim 18, wherein said frame position monitor circuit is capable of performing a start of frame mastership.

20. The apparatus of claim 18, wherein said frame position monitor circuit is capable of generating a frame position monitor sample clock.

21. The apparatus of claim 20, wherein said frame position monitor circuit is capable of dividing said frame position monitor sample clock by a plurality of values.

22. The apparatus of claim 18, wherein said frame position monitor circuit is capable of generating a frame position updated signal.

23. The apparatus of claim 18, wherein said frame position monitor circuit is capable of generating a latch frame count signal.

24. The apparatus of claim 8, wherein said auto rate control circuit further comprises:
- an auto rate counter for generating a data frame count value;
- an auto rate register for latching said data frame count value generated by said auto rate counter;
- an auto rate controller for controlling said auto rate counter and said auto rate register; and
- a left-shifter multiplier for multiplying a latched data frame count value by one of a plurality of values.

25. The apparatus of claim 24, wherein said auto rate control circuit is capable of controlling a data rate of an data endpoint.

26. The apparatus of claim 25, wherein said data endpoint is an isochronous data endpoint.

27. The apparatus of claim 24, wherein said auto rate control circuit is capable of generating a data packet size signal.

28. The apparatus of claim 27, wherein said data packet size signal is an isochronous packet size signal.

29. The apparatus of claim 28, wherein said auto rate control circuit is capable of sending said isochronous packet size signal to a data endpoint.

30. The apparatus of claim 24, wherein said auto rate counter is incremented by said auto rate controller using a frame position sample monitor clock.

31. The apparatus of claim 24, wherein said auto rate controller is capable of clearing and re-enabling said auto rate counter.

32. The apparatus of claim 8, wherein said frame number monitor circuit further comprises:
- a frame number monitor counter for latching a frame number signal and generating a latched frame number monitor signal;
- a time stamp match register for generating a time stamp match signal using said latched frame number monitor signal; and
- a set of digital logic electronically coupled with said frame number monitor counter and said time stamp match register for latching said frame number signal and generating a time stamp match signal.

33. The apparatus of claim 32, wherein said frame number monitor counter increments said latched frame number signal in response to an assertion of a missed start of frequency signal.

34. The apparatus of claim 32, wherein said frame number monitor circuit generates said time stamp match signal in response to a determination that said latched frame number signal is one of equal to and greater than a time stamp match value signal.

35. The apparatus of claim 32, wherein said latched frame number monitor signal contains a universal serial bus frame number value.

36. The apparatus of claim 32, wherein said time stamp match register can be loaded with data using a software control.

37. A method for performing adaptive frame tracking, comprising:
- monitoring at least one data packet from a data stream;
- supporting transmit data buffering of said data packet;
- determining whether at least one data packet is missing from a received data stream;
- establishing a start of frame rate control for said data packet for said missing data packet; and
- supporting an auto rate control of said data packet, supporting said auto rate control comprising adjusting a data rate of said data packet if there exists at least one data frame error.

38. The method of claim 37, wherein receiving and sending at least one data packet from a data stream further comprises receiving universal serial bus isochronous data packets.

39. The method of claim 37, wherein determining whether at least one data packet is missing from a received data stream further comprises performing start of frame error checking.

40. The method of claim 37, wherein supporting an auto rate control of said data packet further comprises automatically adjusting a data rate of said data packets to match a data rate of a universal serial bus communication system.

41. An apparatus for performing adaptive frame tracking, comprising:
- means for receiving and sending at least one data packet from a data stream;
- means for supporting transmit data buffering of said data packet;
- means for determining whether at least one data packet is missing from a received data stream;
- means establishing a start of frame rate control for said data packet for said missing data packet; and
- means for supporting an auto rate control of said data packet, means for supporting said auto rate control comprising means for adjusting a data rate of said data packet if there exists at least one data frame error.

* * * * *